United States Patent
Hsieh et al.

(10) Patent No.: US 9,791,913 B2
(45) Date of Patent: Oct. 17, 2017

(54) SERVER AND CONTROL METHOD THEREOF

(71) Applicant: Wistron Corp., New Taipei (TW)

(72) Inventors: Cheng Kuang Hsieh, New Taipei (TW); Han-Chieh Kuan, New Taipei (TW)

(73) Assignee: WISTRON CORP., New Taipei (TW)

( * ) Notice: Subject to any disclaimer, the term of this patent is extended or adjusted under 35 U.S.C. 154(b) by 8 days.

(21) Appl. No.: 14/982,232

(22) Filed: Dec. 29, 2015

(65) Prior Publication Data
US 2017/0068301 A1    Mar. 9, 2017

(30) Foreign Application Priority Data

Sep. 9, 2015 (TW) .............................. 104129744 A

(51) Int. Cl.
 G06F 1/32 (2006.01)
 G06F 3/06 (2006.01)

(52) U.S. Cl.
 CPC ............ *G06F 1/3268* (2013.01); *G06F 1/325* (2013.01); *G06F 1/3256* (2013.01); *G06F 1/3275* (2013.01); *G06F 3/0625* (2013.01)

(58) Field of Classification Search
 CPC .... G06F 1/3268; G06F 1/3256; G06F 1/3275; G06F 1/325; G06F 3/0625
 See application file for complete search history.

(56) References Cited

U.S. PATENT DOCUMENTS

| | | | | |
|---|---|---|---|---|
| 7,370,215 B2* | 5/2008 | Bennett | ................. | G06F 1/3203 713/300 |
| 8,595,522 B2* | 11/2013 | Cooper | ................. | G06F 1/3221 713/300 |
| 8,671,296 B2* | 3/2014 | Yoshida | ................ | G06F 1/3203 713/320 |
| 2011/0264934 A1* | 10/2011 | Branover | .............. | G06F 1/3203 713/320 |
| 2015/0106644 A1 | 4/2015 | Lin et al. | | |

FOREIGN PATENT DOCUMENTS

TW    201516634    5/2015

OTHER PUBLICATIONS

Chinese language office action dated Aug. 29, 2016, issued in application No. TW 104129744.
English language translation of pertinent paragraphs of office action.

\* cited by examiner

*Primary Examiner* — Stefan Stoynov
(74) *Attorney, Agent, or Firm* — McClure, Qualey & Rodack, LLP

(57) ABSTRACT

A server including a first storage unit, a control unit, and a host is provided. The first storage unit enters a first sleep mode or a second sleep mode according to a first control signal. When operating in the first sleep mode, the storage unit has a first power consumption value. When operating in the second sleep mode, the storage unit has a second power consumption value that is different from the first power consumption value. The control unit adjusts the first control signal according to a switching signal. The host generates the switching signal according to an access state of the first storage unit.

20 Claims, 9 Drawing Sheets

SERVER AND CONTROL METHOD THEREOF

CROSS REFERENCE TO RELATED APPLICATIONS

This Application claims priority of Taiwan Patent Application No. 104129744, filed on Sep. 9, 2015, the entirety of which is incorporated by reference herein.

BACKGROUND OF THE INVENTION

Field of the Invention

The invention relates to a server, and more particularly to a server which is capable of setting the operation mode of a storage unit according to the access state of the storage unit.

Description of the Related Art

Generally, a user is capable of utilizing the network to store data in remote servers. For the purposes of user-access, the remote server continuously operates in a normal mode. Therefore, the server has a high level of power consumption. To reduce the amount of power consumed, the server may enter a sleep mode. When the server operates in a deep sleep mode, the server cannot immediately provide data to the user.

BRIEF SUMMARY OF THE INVENTION

In accordance with an embodiment, a server comprises a first storage unit, a control unit, and a host. The first storage unit enters a first sleep mode or a second sleep mode according to a first control signal. When operating in the first sleep mode, the storage unit has a first power consumption value. When operating in the second sleep mode, the storage unit has a second power consumption value that is different from the first power consumption value. The control unit adjusts the first control signal according to a switching signal. The host generates the switching signal according to the access state of the first storage unit.

An exemplary embodiment of a control method for controlling a first storage unit is described in the following. The first storage unit is directed to enter a first sleep mode or a second sleep mode according to the access state of the first storage unit. When entering the first sleep mode, the first storage unit has a first power consumption value. When entering the second sleep mode, the first storage unit has a second power consumption value that is different from the first power consumption value. It is determined whether an access request has been received. The first storage unit is directed to leave the first or second sleep mode when the access request has been received.

A detailed description is given in the following embodiments with reference to the accompanying drawings.

BRIEF DESCRIPTION OF THE DRAWINGS

The invention can be more fully understood by referring to the following detailed description and examples with references made to the accompanying drawings, wherein.

DETAILED DESCRIPTION OF THE INVENTION

The making and using of the embodiments of the disclosure are discussed in detail below. It should be appreciated, however, that the embodiments provide many applicable inventive concepts that can be embodied in a wide variety of specific contexts. The specific embodiments discussed are merely illustrative, and do not limit the scope of the disclosure.

Figure 1:
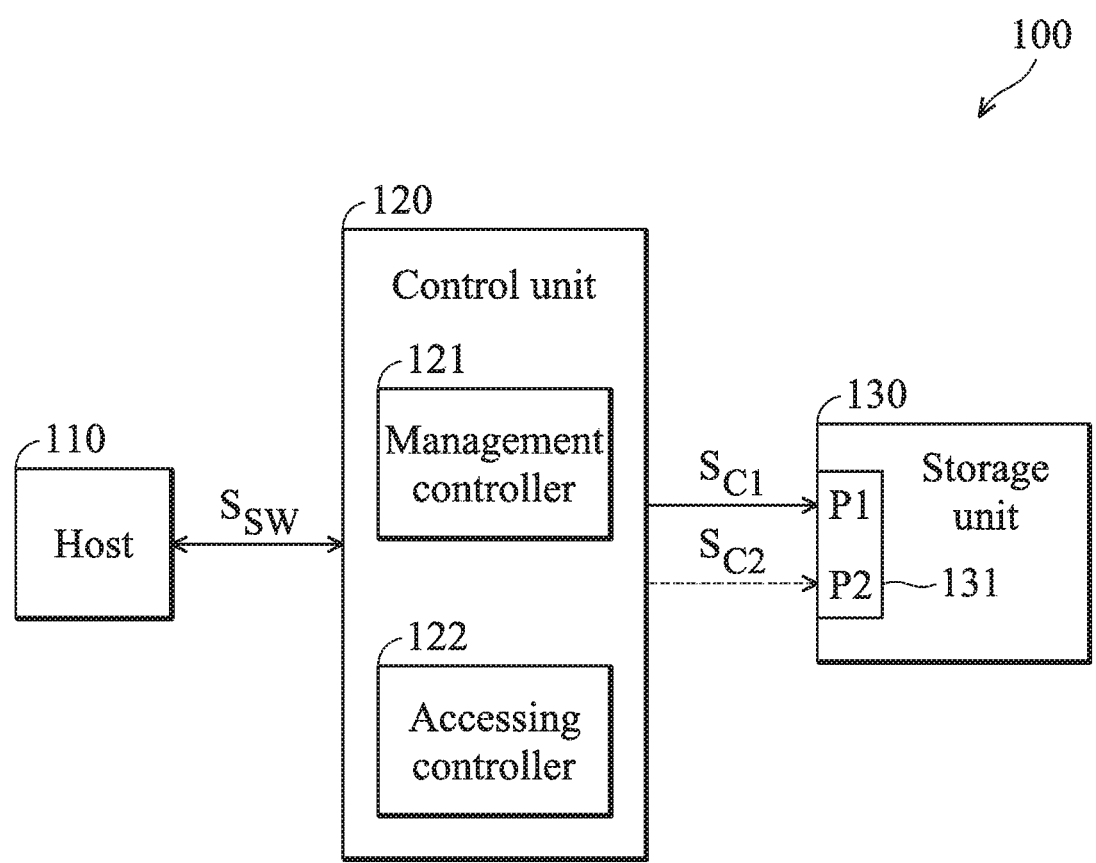
FIG. 1 is a schematic diagram of a server, in accordance with an embodiment of the invention.

FIG. 1 is a schematic diagram of a server, in accordance with an embodiment of the invention. The server 100 comprises a host 110, a control unit 120 and a storage unit 130. The host 110 generates a switching signal $S_{SW}$ according to the access state of the storage unit 130. For example, when the host 110 accesses the storage unit 130, the host records the frequency of accessing the storage unit 130 or records a time point when the storage unit 130 is accessed. The host 110 generates a corresponding switching signal according to the recorded result to control the operation mode of the storage unit 130.

The control unit 120 generates a control signal $S_{C1}$ according to the switching signal $S_{SW}$. In this embodiment, the control unit 120 comprises a management controller 121 and an accessing controller 122. The management controller 121 is configured to manage the storage unit 130. For example, the management controller 121 monitors the operation and the temperature of the storage unit 130 or supplies power to the storage unit 130. The accessing controller 122 adjusts the control signal $S_{C1}$ according to the switching signal $S_{SW}$. In other embodiments, the accessing controller 122 generates many control signals, such as $S_{C1}$ and $S_{C2}$.

The storage unit 130 enters a corresponding operation mode according to at least one control signal. In this embodiment, the storage unit 130 comprises a connection port 131. The connection port 131 is configured to coupled to the control unit 120. The pin P1 of the connection port 131 receives the control signal $S_{C1}$, and the pin P2 of the connection port 131 receives the control signal $S_{C2}$, but the disclosure is not limited thereto. In some embodiments, the connection port 131 only receives a single control signal, or it receives three or more control signals.

The invention does not limit the kind of connection port 131. In one embodiment, the connection port 131 is a serial ATA (SATA) connection port or a serial attached SCSI (SAS) connection port. In this case, the third pin and the eleventh pin of the SATA or SAS connection port receive the control signals $S_{C1}$ and $S_{C2}$ respectively. The invention does not limit the kind of storage unit 130. The storage unit 130 may be a hard disk drive (HDD) or a solid state drive (SSD). In other embodiments, the connection port 131 comprises other input/output pins (not shown) configured to receive data provided from the host 110 or provide data to the host 110.

The storage unit 130 enters the corresponding operation mode only according to a signal control signal (e.g. $S_{C1}$) or according to various control signals (e.g. $S_{C1}$ and $S_{C2}$). For example, when the levels of the control signals $S_{C1}$ and $S_{C2}$ match a first pre-determined state, for example, the control signal $S_{C1}$ is at a first level and the control signal $S_{C2}$ is at a second level, the storage unit 130 enters a first operation mode, such as the first sleep mode. When the levels of the control signals $S_{C1}$ and $S_{C2}$ match a second pre-determined state, for example, the control signal $S_{C1}$ is at the second level and the control signal $S_{C2}$ is at the first level, the storage unit 130 enters a second operation mode, such as the second sleep mode. When the levels of the control signals $S_{C1}$ and $S_{C2}$ match a third pre-determined state, for example, the control signals $S_{C1}$ and $S_{C2}$ are at the second level, the storage unit 130 enters a third operation mode, such as the third sleep mode. When the levels of the control signals $S_{C1}$ and $S_{C2}$ match a fourth pre-determined state, for example, the control signals $S_{C1}$ and $S_{C2}$ are at the first level, the storage unit 130 enters a fourth operation mode, such as a normal mode. In this embodiment, the first level is opposite to the second level. For example, when the first level is a high level, the second level is a low level. Conversely, when the first level is a low level, the second level is a high level. When the storage unit 130 operates in different sleep modes, the storage unit 130 has different levels of power consumption value.

FIGS. 2A~2B and 4A~4B are utilized to describe how the storage unit 130 enters different operation modes according to a single control signal, such as $S_{C1}$. First, refer to FIG. 2A, the storage unit 130 determines whether the control signal $S_{C1}$ is changed from a first level to a second level (step S211). The first level is opposite to the second level. For example, when the first level is a high level, the second level is a low level, and when the first level is the low level, the second level is the high level.

When the level of the control signal $S_{C1}$ is not changed from the first level to the second level, step S211 is executed. When the level of the control signal $S_{C1}$ is changed from the first level to the second level, the storage unit 130 determines whether the level of the control signal $S_{C1}$ is again changed from the first level to the second level during a first pre-determined period (step S212).

When the level of the control signal $S_{C1}$ is not changed again from the first level to the second level during the first pre-determined period, the storage unit 130 enters a first sleep mode (step S213). However, when the level of the control signal $S_{C1}$ is again changed from the first level to the second level during the first pre-determined period, the storage unit 130 determines whether the level of the control signal $S_{C1}$ is again changed from the first level to the second level during a second pre-determined period (step S214). When the level of the control signal $S_{C1}$ is not changed from the first level to the second level during the second pre-determined period, the storage unit 130 enters a second sleep mode (step S215). However, when the level of the control signal $S_{C1}$ is changed from the first level to the second level during the second pre-determined period, the storage unit 130 enters a third sleep mode (step S216). In one embodiment, the first pre-determined period is equal to the second pre-determined period.

Figure 2A:
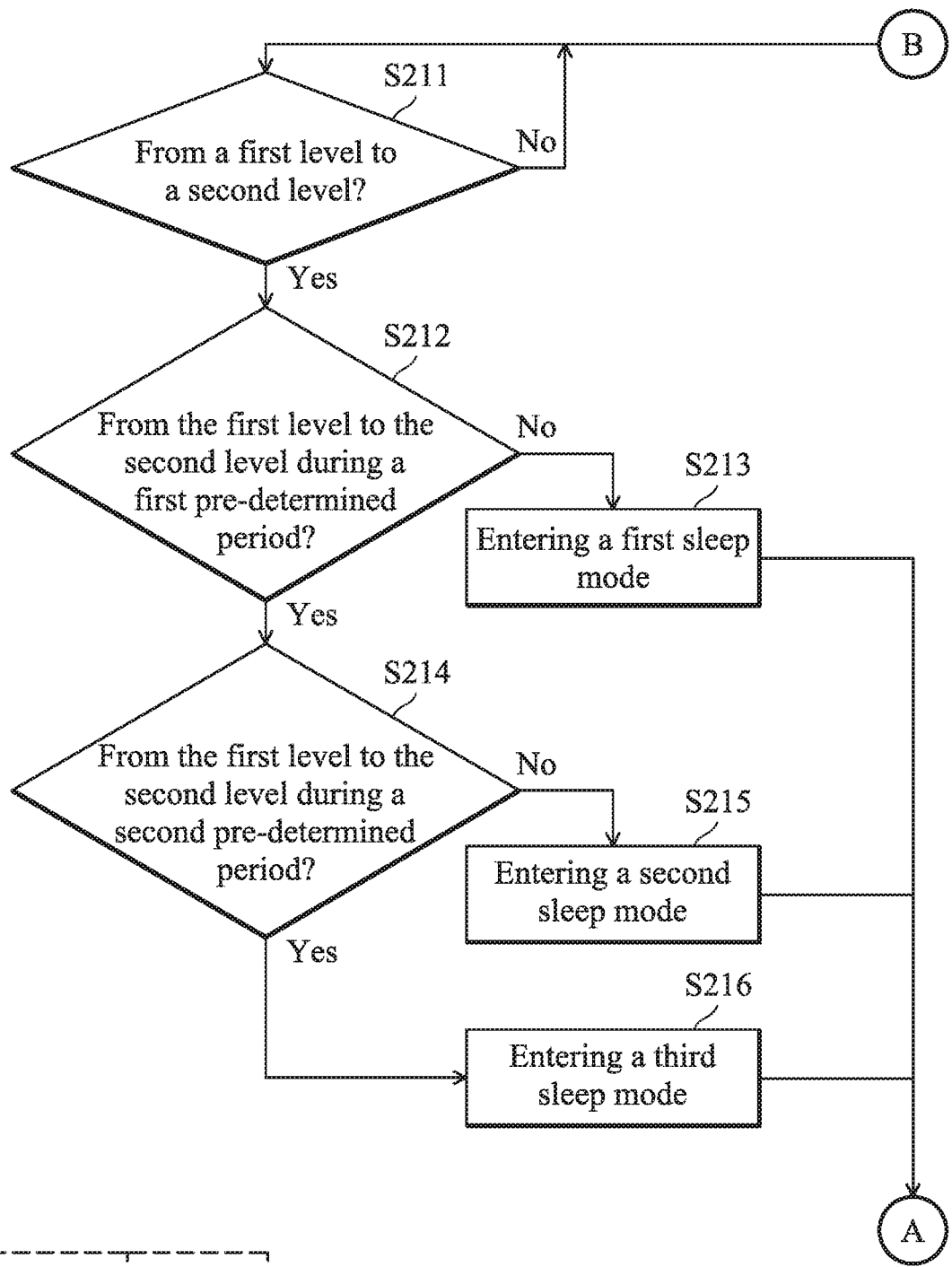
FIGS. 2A and 2B is a flow chart of a determining method for a the storage unit of the invention.
Figure 2B:
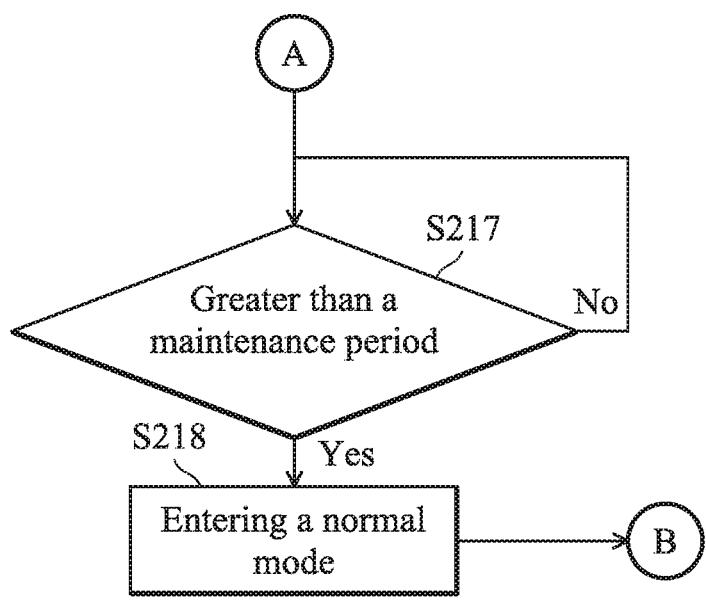

Refer to FIG. 2B, after the storage unit 130 enters the corresponding sleep mode, the storage unit 130 determines whether a duration during which the level of the control signal $S_{C1}$ is at the first level is greater than the maintenance period (step S217). When the duration is not greater than the maintenance period, step S217 is executed. When the duration during which the level of the control signal $S_{C1}$ is at the first level is greater than the maintenance period, the storage unit 130 leaves the corresponding sleep mode and enters a normal mode (step S218). In one embodiment, the maintenance period is equal to the first pre-determined period.

Figure 3A:
FIGS. 3A~3C are schematic diagrams of a control signal, in accordance with embodiments of the invention.
Figure 3B:
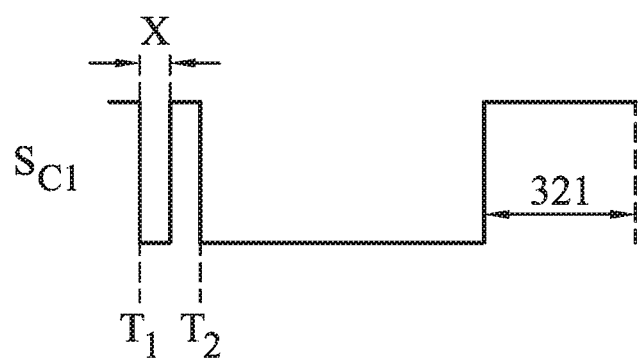
Figure 3C:
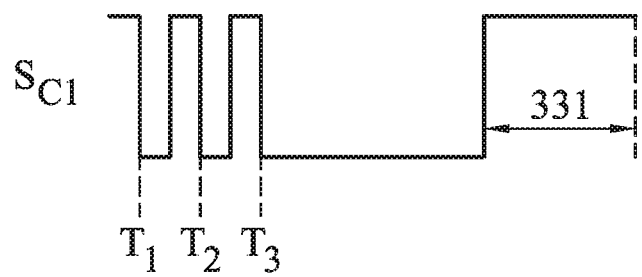

FIGS. 3A~3C are schematic diagrams of a control signal, in accordance with embodiments of the invention. Refer to FIG. 3A, the level of the control signal $S_{C1}$ is changed from the first level to the second level and maintains at the second level at time point $T_1$. Since the duration of the level of the control signal $S_{C1}$ being at the second level is greater than a first pre-determined period, it means that the level of the control signal $S_{C1}$ is not changed from the first level to the second level during the first pre-determined period. Therefore, the storage unit 130 enters a first sleep mode. Additionally, during the period 311, the duration of the level of the control signal $S_{C1}$ being at the first level is greater than a maintenance period. Therefore, the storage unit 130 leaves the first sleep mode and enters a normal mode.

Refer to FIG. 3B. The level of the control signal $S_{C1}$ is changed from the first level to the second level at time point $T_1$, and the level of the control signal $S_{C1}$ is again changed from the first level to the second level at time point $T_2$ and maintained at the second level. Since the duration during which the level of the control signal $S_{C1}$ is maintained at the second level is greater than a second pre-determined period, it means that the level of the control signal $S_{C1}$ is not changed from the first level to the second level during the second pre-determined period. Therefore, the storage unit 130 enters a second sleep mode. In one embodiment, the first and second pre-determined periods are greater than the difference between the time points $T_1$ and $T_2$. In other embodiments, assuming that the width of the low pulse of the control signal $S_{C1}$ is X. In this case, the widths of the first and second pre-determined periods may be 3X. Furthermore, the duration when the level of the control signal $S_{C1}$ is at the first level is greater than a maintenance period. Therefore, the storage unit 130 leaves the second sleep mode and enters a normal mode. In one embodiment, the duration of the maintenance period is 3X, but the disclosure is not limited thereto.

Refer to FIG. 3C. At time points $T_1$, $T_2$ and $T_3$, the level of the control signal $S_{C1}$ is changed from the first level to the second level. After time point $T_3$, the level of the control signal $S_{C1}$ is maintained at the second level. Since the duration during which the level of the control signal $S_{C1}$ is at the second level is greater than a third pre-determined period, it means that the level of the control signal $S_{C1}$ is not changed again from the first level to the second level during the third pre-determined period. Therefore, the storage unit 130 enters a third sleep mode. Additionally, during the period 331, the duration when the level of the control signal $S_{C1}$ is at the first level is greater than a maintenance period. Therefore, the storage unit 130 leaves the third sleep mode and enters a normal mode.

Figure 4A:
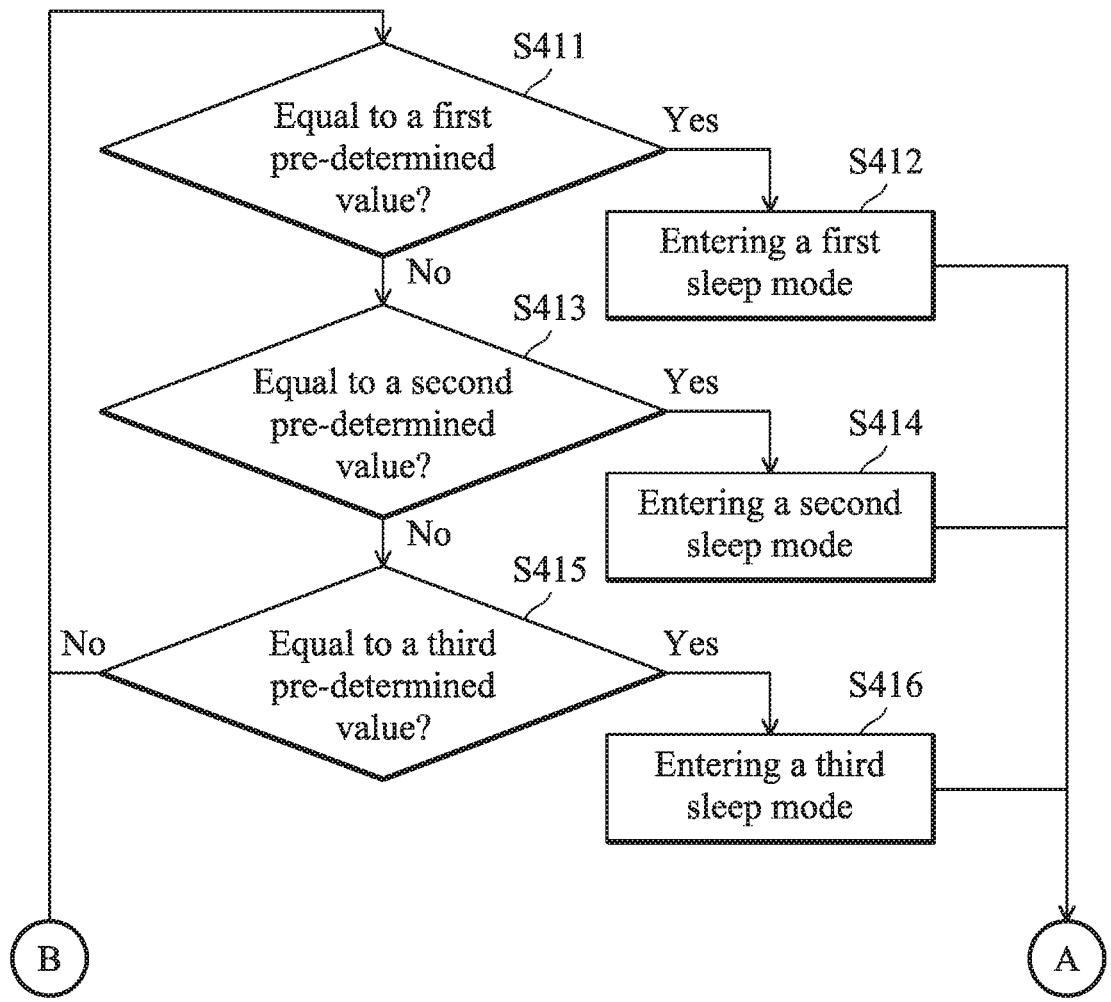
FIGS. 4A and 4B is another flow chart of a determining method for a the storage unit of the invention.
Figure 4B:
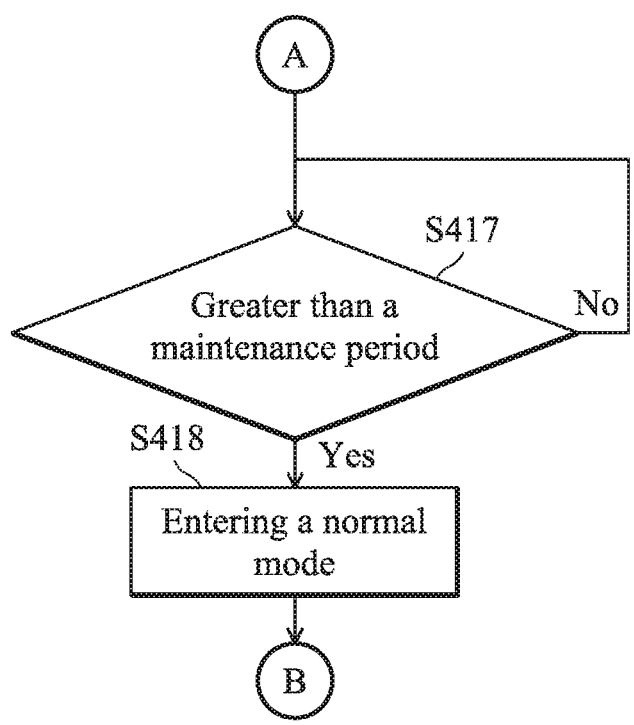

FIGS. 4A and 4B is another flow chart of a determining method for a the storage unit of the invention. Refer to FIG. 4A. It is determined whether the duty cycle of the control signal $S_{C1}$ is equal to a first pre-determined value (step S411). When the outcome of step S411 is true then step S412 may be performed, otherwise step S413 may be performed. In step S412, the storage unit 130 enters a first sleep mode. In step S413, it is determined whether the duty cycle of the control signal $S_{C1}$ is equal to a second pre-determined value. When the duty cycle of the control signal $S_{C1}$ is equal to the second pre-determined value, the storage unit 130 enters a second sleep mode (step S414). When the duty cycle of the control signal $S_{C1}$ is not equal to the second pre-determined value, it determined whether the duty cycle of the control signal $S_{C1}$ is equal to a third pre-determined value (step S415). When the duty cycle of the control signal $S_{C1}$ is not equal to the third pre-determined value, step S411 is performed. When the duty cycle of the control signal $S_{C1}$ is equal to the third pre-determined value, the storage unit 130 enters a third sleep mode (step S416).

As shown in FIG. 4B, after the storage unit 130 enters the corresponding sleep mode, the storage unit 130 determines whether the level of the control signal $S_{C1}$ is maintained at a specific level and whether the duration during which the level of the control signal $S_{C1}$ is at the specific level is greater than a maintenance period (step S417). If the outcome of step S417 is false then step S417 is performed, otherwise step S418 is performed. In step S418, the storage unit 130 enters a normal mode. In one embodiment, the maintenance period is greater than the period of the control signal $S_{C1}$.

Figure 5A:
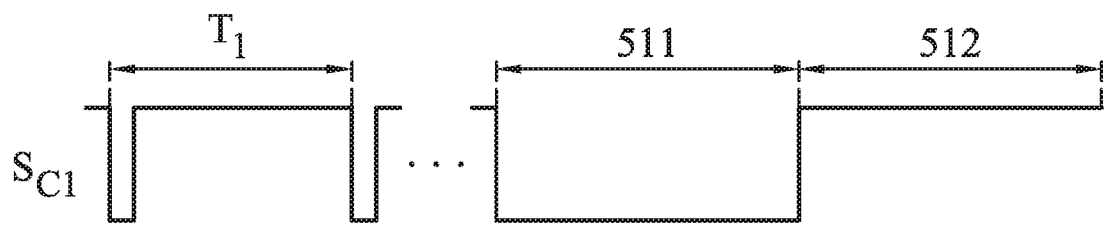
FIGS. 5A~5C are schematic diagrams of a control signal, in accordance with another embodiment of the invention.
Figure 5B:
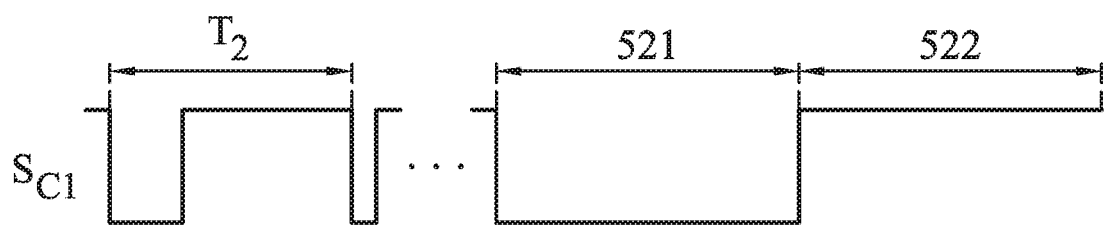
Figure 5C:
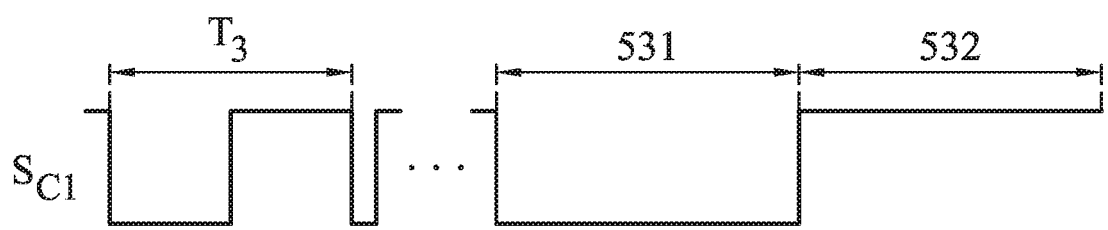

FIGS. 5A~5C are schematic diagrams of a control signal, in accordance with another embodiment of the invention. Refer to FIG. 5A. Since the duty cycle of the control signal $S_{C1}$ matches a first pre-determined value (e.g. 90%), the storage unit 130 enters a first sleep mode. In one embodiment, the control unit 120 continuously provides the control signal $S_{C1}$ whose duty cycle is 90%. In another embodiment, when the duration 511 during which the level of the control signal $S_{C1}$ is maintained at the low level arrives a pre-determined period, the storage unit 130 starts to enter the first sleep mode. However, when the duration 512 during which the level of the control signal $S_{C1}$ is maintained at the high level (i.e. the specific level) arrives a pre-determined period, the storage unit 130 leaves the first sleep mode and enters a normal mode. In one embodiment, the durations 511 and 512 are greater than the period T1 of the control signal $S_{C1}$.

Refer to FIG. 5B. Since the duty cycle of the control signal $S_{C1}$ matches a second pre-determined value, such as 70%, the storage unit 130 enters a second sleep mode. When the duration 521 during which the level of the control signal $S_{C1}$ is maintained at the low level arrives a pre-determined period, the storage unit 130 starts to enter the second sleep mode. However, when the duration 522 during which the level of the control signal $S_{C1}$ is maintained at the high level (i.e. the specific level) arrives a pre-determined period, the storage unit 130 leaves the second sleep mode and enters a normal mode. In one embodiment, the durations 521 and 522 are greater than the period T2 of the control signal $S_{C1}$.

Refer to FIG. 5C. Since the duty cycle of the control signal $S_{C1}$ matches a third pre-determined value, such as 50%, the storage unit 130 enters a third sleep mode. When the duration 531 during which the level of the control signal $S_{C1}$ is maintained at the low level arrives a pre-determined period, the storage unit 130 starts to enter the third sleep mode. However, when the duration 532 during which the level of the control signal $S_{C1}$ is maintained at the high level (i.e. the specific level) arrives a pre-determined period, the storage unit 130 leaves the third sleep mode and enters a normal mode. In one embodiment, the durations 531 and 532 are greater than the period T3 of the control signal $S_{C1}$.

The control unit 120 generates the corresponding control signal according to the switching signal $S_{SW}$ such that the storage unit 130 enters the corresponding sleep mode. Therefore, when the host 110 generates the switching signal $S_{SW}$ according to the access state of the storage unit 130, the storage unit 130 is controlled to enter a corresponding sleep mode according to its access state.

In one embodiment, the host 110 accesses the storage unit 130, and simultaneously, the host 110 records the number of times that the storage unit 130 is accessed. When the number of times that the storage unit 130 is accessed is greater than a first pre-determined value, it means that the host 110 usually accesses the storage unit 130. Therefore, when the host 110 stops accessing the storage unit 130, the host 110 utilizes the switching signal $S_{SW}$ to control the storage unit 130 to enter a light sleep mode, such as the first sleep mode. When the number of times that the storage unit 130 is accessed is less than the first pre-determined value, it means that the host 110 seldom accesses the storage unit 130. Therefore, when the host 110 stops accessing the storage unit 130, the host 110 utilizes the switching signal $S_{SW}$ to control the storage unit 130 to enter a deep sleep mode, such as the second sleep mode.

In another embodiment, the host 110 generates the switching signal $S_{SW}$ according to the difference between the latest time point when the storage unit 130 is accessed and the current time point. For example, when the difference between the latest time point when the storage unit 130 is accessed and the current time point is less than a second pre-determined value, it means that the host 110 usually accesses the storage unit 130. Therefore, the host 110 utilizes the switching signal $S_{SW}$ to direct the storage unit 130 to enter a light sleep mode, such as the first sleep mode. When the difference between the latest time point when the storage unit 130 is accessed and the current time point is greater than the second pre-determined value, it means that the host 110 seldom accesses the storage unit 130. Therefore, the host 110 utilizes the switching signal $S_{SW}$ to direct the storage unit 130 to enter a deep sleep mode, such as the second sleep mode.

Since the host 110 directs the storage unit 130 to enter different sleep modes according to the access state of the storage unit 130, the power consumption value of the storage unit 130 is reduced. For example, when the data stored in the storage unit 130 is usually used, it means that the data stored in the storage unit 130 is hot data. Therefore, when the host 110 stops accessing the storage unit 130, the storage unit 130 is directed to enter a light sleep mode. However, when the data stored in the storage unit 130 is seldom used, it means that the data stored in the storage unit 130 is cold data. Therefore, when the host 110 does not access the storage unit 130, the host 110 controls the storage unit 130 to enter a deep sleep mode.

Figure 6:
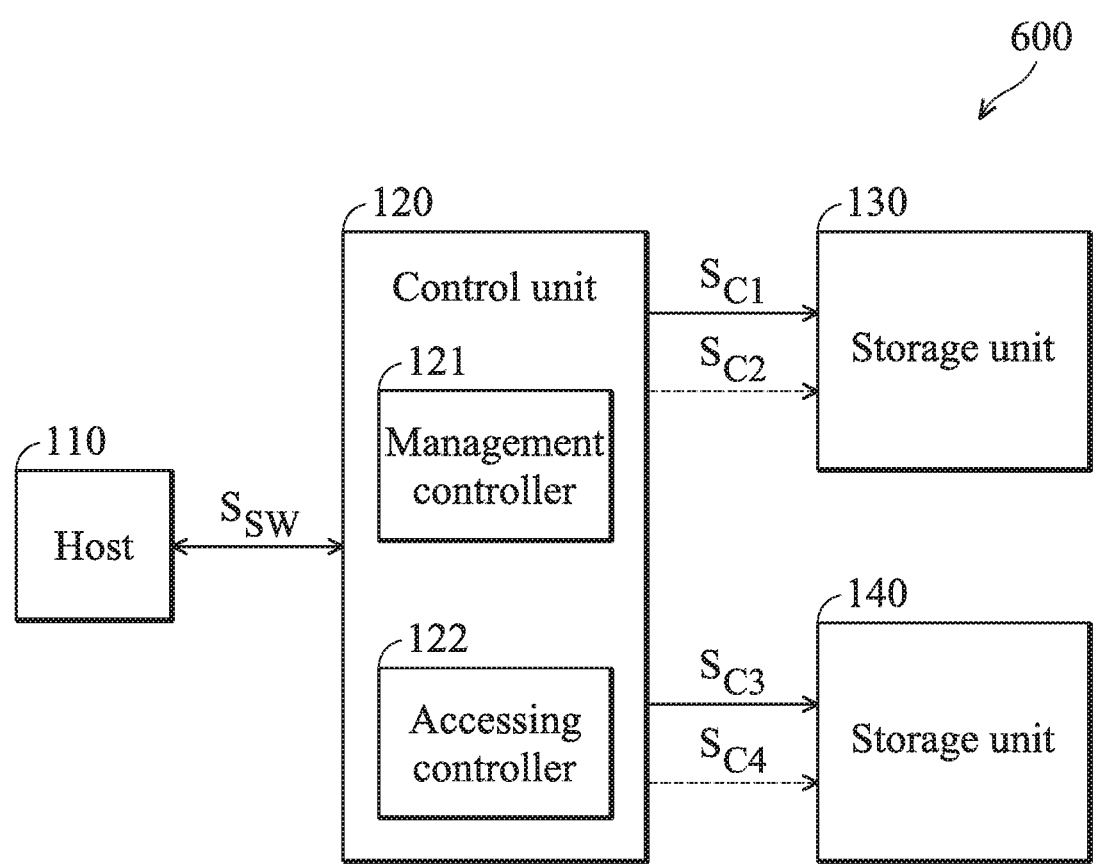
FIG. 6 is a schematic diagram of a server, in accordance with another embodiment of the invention.

FIG. 6 is a schematic diagram of a server, in accordance with another embodiment of the invention. FIG. 6 is similar to FIG. 1 except for the addition of a storage unit 140. Since the operations of the storage units 130 and 140 are the same, the description of the storage unit 140 is omitted for brevity. In one embodiment, the storage units 130 and 140 do not enter the same sleep mode, but the disclosure is not limited thereto. For example, when the storage unit 130 enters a first sleep mode, the storage unit 140 may enter or not enter the first sleep mode. In one embodiment, when the storage unit 130 enters the first sleep mode, the storage unit 140 enters a second sleep mode.

The host 110 directs the storage units 130 and 140 to enter the corresponding sleep modes according to the access states of the storage units 130 and 140. For example, when the storage unit 130 stores hot data and the storage unit 140 stores cold data, the host 110 directs the storage unit 130 to enter a light sleep mode, such as a first sleep mode and directs the storage unit 140 to enter a deep sleep mode, such as a second sleep mode.

After the storage units 130 and 140 enter the corresponding sleep modes, if the host 110 receives an access request, the host 110 determines that an access address corresponds to the storage unit 130 or 140. When the access address corresponds to the storage unit 140, the host 110 generates the corresponding switching signal $S_{SW}$ to wake the storage unit 140 up. Therefore, the storage unit 140 leaves the second sleep mode and enters a normal mode. After the storage unit 140 enters the normal mode, the host 110 accesses the storage unit 140 again. After the storage unit 140 is accessed, the host 110 again directs the storage unit 140 to enter the second sleep mode or directs the storage unit 140 to enter the first sleep mode.

In one embodiment, one of the storage units 130 and 140 enters the corresponding sleep mode according to a single control signal and the other enters the corresponding sleep mode according to two control signals. In some embodiments, one of the storage units 130 and 140 enters the corresponding sleep mode according to a single control signal (e.g. $S_{C1}$) and the other enters the corresponding sleep mode according to another single control signal (e.g. $S_{C3}$). In another embodiment, one of the storage units 130 and 140 enters the corresponding sleep mode according to many single control signals and the other enters the corresponding sleep mode according to other control signals.

Figure 7:
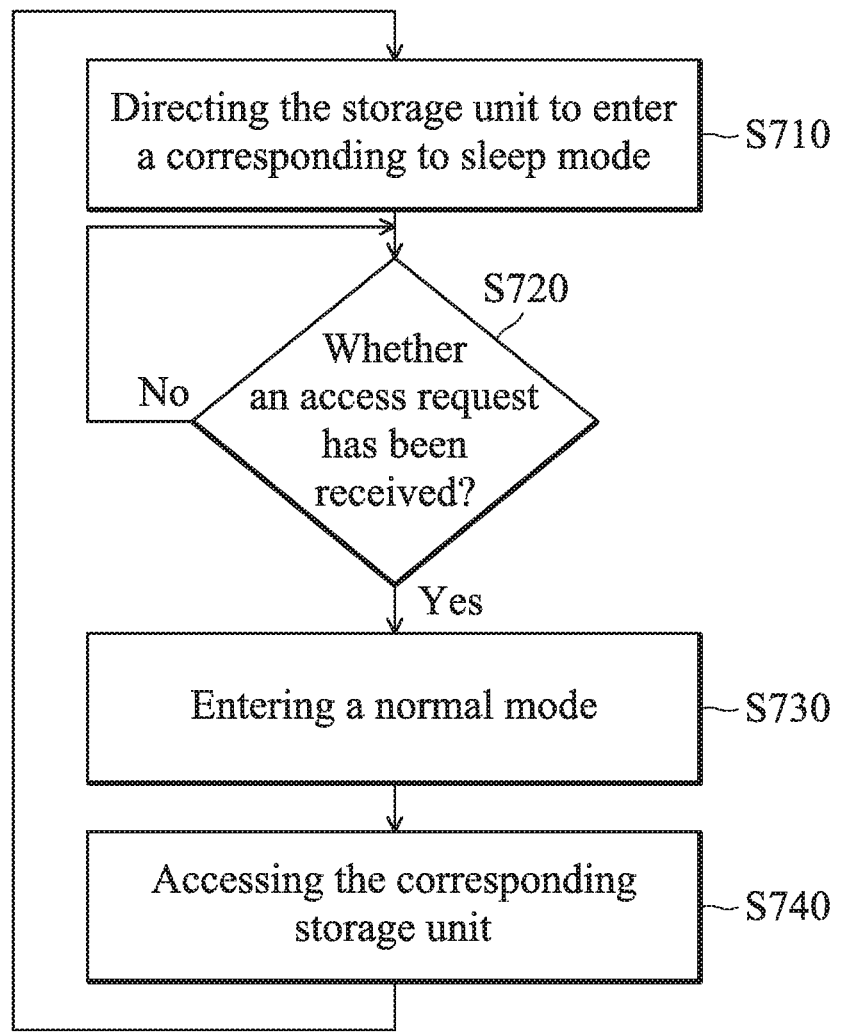
FIG. 7 is a flow chart of a control method in accordance with an embodiment of the invention.

FIG. 7 is a flow chart of a control method in accordance with an embodiment of the invention. The control method of the invention is applied to control a storage unit to enter a corresponding operation mode. First, the access state of the storage unit is utilized to direct the storage unit to enter a corresponding to sleep mode (step S710). For the sake of brevity, it is assumed that the storage unit may enter a first sleep mode or a second sleep mode, but the disclosure is not limited thereto. In some embodiments, the number of sleep modes is greater than 2.

In one embodiment, the access state is the number of times that the storage unit is accessed or the latest time point when the storage unit is accessed. For example, when the number of times that the storage unit is accessed is greater than a pre-determined value, it means that the storage unit is often accessed. Therefore, the storage unit is directed to enter a light sleep mode, such as the first sleep mode. However, when the number of times that the storage unit 130 is accessed is less than the pre-determined value, it means that the storage unit is seldom assessed. Therefore, the storage unit is directed to enter a deep sleep mode, such as the second sleep mode. In another embodiment, when the difference between the latest time points when the storage unit is accessed and the current time point is less than another pre-determined value, it means that the storage unit is usually accessed. Therefore, the storage unit is directed to enter a light sleep mode, such as the first sleep mode. However, when the difference between the latest time points when the storage unit is accessed and the current time point is greater than the another pre-determined value, it means that the storage unit is seldom accessed. Therefore, the storage unit is directed to enter a deep sleep mode, such as the second sleep mode.

In other embodiments, the storage unit enters the corresponding sleep mode according to the level of a control signal. For example, when the number of times that the level of the control signal is changed from a first level to a second level during a pre-determined period is equal to a first pre-determined value, the storage unit enters the first sleep mode. When the number of times that the level of the control signal is changed from the first level to the second level during the pre-determined period is equal to a second pre-determined value, the storage unit enters the second sleep mode.

In another embodiment, the storage unit enters the corresponding to sleep mode according to the duty cycle of the control signal. For example, when the duty cycle of the control signal is equal to a first pre-determined value, the storage unit enters the first sleep mode. When the duty cycle of the control signal is equal to a second pre-determined value, the storage unit enters the second sleep mode.

In some embodiments, the storage unit enters the corresponding sleep mode according to the levels of many control signals. Taking two control signals as an example, when the levels of the control signals match a first pre-determined state, for example a first control signal is at a high level and a second control is at a low level, the storage unit enters the first sleep mode. However, when the levels of the control signals match a second pre-determined state, for example a first control signal is at a low level and a second control is at a high level, the storage unit enters the second sleep mode.

When the storage unit operates in the first sleep mode, the storage unit has a first power consumption value. When the storage unit operates in the second sleep mode, the storage unit has a second power consumption value. The first power consumption value is different from the second power consumption value. In one embodiment, the first power consumption value is less than the second power consumption value.

Then, it is determined whether an access request has been received (step S720). If no access request has been received, the storage unit still operates in the corresponding sleep mode. However, if an access request has been received, the storage unit leaves the corresponding sleep mode and enters a normal mode (step S730). In one embodiment, the storage unit determines whether to leave the sleep mode according to the control signal. For example, when the duration during which the control signal is at a specific level arrives a maintenance period, the storage unit leaves the sleep mode. In other embodiments, the storage unit determines whether to leave the sleep mode according to two control signals. For example, when the levels of the two control signals match a third pre-determined state, for example the levels of the control signals are at a high level or at a low level, the storage unit leaves the sleep mode.

The control method of the invention can be applied for two storage units. In one embodiment, the two storage units are directed to enter the corresponding mode according to access states of the two storage units. For example, when a first storage unit stores hot data and a second storage unit stores cold data, the first storage unit is directed to enter a light sleep mode and the second storage unit is directed to enter a deep sleep mode. In some embodiments, the two storage units enter the same sleep mode.

The corresponding storage unit is accessed according to the access request (step S740). For example, when a host receives an access request, the host determines that an access address corresponds to the first or second storage unit. If the access address corresponds to the first storage unit, the host directs the first storage unit to leave the sleep mode and enter a normal mode. After the first storage unit enters the normal mode, the host accesses the first storage unit according to the access address. After the host accesses the first storage unit, the host directs the first storage unit to enter the first or second sleep mode.

In this embodiment, when the data stored in the storage unit is hot data, the storage unit is directed to enter a light sleep mode. In the light sleep mode, the time during which the storage unit leaves from the light sleep mode to the normal mode is short. Therefore, the storage unit can be wake up during a short time. However, if the data stored in the storage unit is cold data, the storage unit is directed to enter a deep sleep mode to reduce the power consumption value of the storage unit.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A server, comprising:
    a first storage unit entering a first sleep mode or a second sleep mode according to a first control signal, wherein when operating in the first sleep mode, the storage unit has a first power consumption value, when operating in the second sleep mode, the storage unit has a second power consumption value that is different from the first power consumption value;
    an accessing controller adjusting the first control signal according to a switching signal; and
    a host generating the switching signal according to an access state of the first storage unit,
    wherein the first storage unit determines the number of times that the level of the first control signal is changed from a first level to a second level during a predetermined period; when the number of times that the level of the first control signal is changed from the first level to the second level during the predetermined period is equal to a first pre-determined value, the first storage unit enters the first sleep mode, and when the number of times that the level of the first control signal is changed from the first level to the second level during the predetermined period is equal to a second pre-determined value, the first storage unit enters the second sleep mode, and wherein the second pre-determined value is greater than the first pre-determined value,
    wherein the accessing controller comprises an input terminal and an output terminal, the input terminal is coupled to the host to receive the switching signal, and the output terminal is coupled to the first storage unit to provide the first control signal to the first storage unit.

2. The server as claimed in claim 1, wherein the access state is a frequency of accessing the first storage unit or a time point when the first storage unit is accessed.

3. The server as claimed in claim 1, wherein in an access mode, the host generates the switching signal according to an access address and the accessing controller directs the first storage unit to leave the first or second sleep mode according to the switching signal.

4. The server as claimed in claim 1, wherein when the duration of the first control signal being at the first level is longer than a pre-determined period, the first storage unit leaves the first or second sleep mode.

5. The server as claimed in claim 1, wherein the first level is less than the second level.

6. The server as claimed in claim 1, wherein the first level is greater than the second level.

7. The server as claimed in claim 1, further comprising:
    a second storage unit entering the first or second sleep mode according to a level of a second control signal, wherein the host generates the switching signal according to an access state of the second storage unit, the accessing controller adjusts the level of the second control signal according to the switching signal, and when the first storage unit enters the first sleep mode, the second storage unit does not enter the first sleep mode.

8. The server as claimed in claim 7, wherein when the first storage unit enters the first sleep mode, the second storage unit enters the second sleep mode.

9. The server as claimed in claim 1, further comprising:
    a management controller configured to supply power to the first storage unit.

10. The server as claimed in claim 1, wherein the first storage unit is a hard disk drive (HDD) or a solid state drive (SSD).

11. The server as claimed in claim 1, wherein the first storage unit comprises a serial ATA (SATA) connection port or a serial attached SCSI (SAS) connection port.

12. A server, comprising:
    a first storage unit entering a first sleep mode or a second sleep mode according to a first control signal, wherein when operating in the first sleep mode, the storage unit has a first power consumption value, when operating in the second sleep mode, the storage unit has a second power consumption value that is different from the first power consumption value;
    an accessing controller adjusting the first control signal according to a switching signal; and
    a host generating the switching signal according to an access state of the first storage unit, wherein the first storage unit determines a duty cycle of the first control signal during a pre-determined period, when the duty cycle of the first control signal is equal to a first pre-determined value, the first storage unit enters the first sleep mode, when the duty cycle of the first control signal is equal to a second pre-determined value, the first storage unit enters the second sleep mode, and the second pre-determined value is greater than the first pre-determined value,
    wherein the accessing controller comprises an input terminal and an output terminal, the input terminal is coupled to the host to receive the switching signal, and the output terminal is coupled to the first storage unit to provide the first control signal to the first storage unit.

13. The server as claimed in claim 12, wherein a duration when the first control signal is at a specific level is longer than a maintenance period, the first storage unit leaves the first or second sleep mode.

14. A server, comprising:
    a first storage unit entering a first sleep mode or a second sleep mode according to a first control signal, wherein when operating in the first sleep mode, the storage unit has a first power consumption value, when operating in the second sleep mode, the storage unit has a second power consumption value that is different from the first power consumption value;
    an accessing controller adjusting the first control signal according to a switching signal; and
    a host generating the switching signal according to an access state of the first storage unit, wherein the accessing controller generates a second control signal according to the switching signal, and the first storage unit enters the first or second sleep mode according to the first and second control signals, wherein the accessing controller comprises an input terminal and an output terminal, the input terminal is coupled to the host to receive the switching signal, and the output terminal is coupled to the first storage unit to provide the first control signal to the first storage unit, wherein when the first control signal is at a first level and the second control signal is at a second level, the first storage unit enters the first sleep mode, and when the first control signal is at the second level and the second control signal is at the first level, the first storage unit enters the second sleep mode, and wherein when the first and second control signals are at the first level, the first storage unit enters a third sleep mode, and when the first and second control signals are at the second level, the first storage unit enters a normal mode.

15. A control method controlling a first storage unit, comprising:

directing the first storage unit to enter a first sleep mode or a second sleep mode according to the access state of the first storage unit, wherein when entering the first sleep mode, the first storage unit has a first power consumption value, and when entering the second sleep mode, the first storage unit has a second power consumption value that is different from the first power consumption value;

determining whether an access request has been received; and directing the first storage unit to leave the first or second sleep mode when the access request has been received, wherein the step of directing the first storage unit to enter the first or second sleep mode according to the access state of the first storage unit comprises:

generating a first control signal according to the access state of the first storage unit;

determining the number of times that the level of the first control signal is changed from a first level to a second level during a pre-determined period, wherein when the number of times that the level of the first control signal is changed from the first level to the second level is equal to a first pre-determined value, the first storage unit enters the first sleep mode, and when the number of times that the level of the first control signal is changed from the first level to the second level is equal to a second pre-determined value, the first storage unit enters the second sleep mode, and wherein the second pre-determined value is greater than the first pre-determined value; and determining the duration when the level of the first control signal is at the first level, wherein when the duration that the level of the first control signal is at the first level is longer than a maintenance period, the first storage unit leaves the first or second sleep mode.

16. The control method as claimed in claim 15, wherein the access state is a frequency of accessing the first storage unit or a time point when the first storage unit is accessed, and when the access state is less than a predetermined value, the first storage unit is directed to enter the first sleep mode, and when the access state is greater than the predetermined value, the first storage unit is directed to enter the second sleep mode.

17. The control method as claimed in claim 15, further comprising:

directing a second storage unit to enter the first or second sleep mode according to the access state of the second storage unit.

18. The control method as claimed in claim 17, wherein when the first storage unit is directed to enter the first sleep mode, the second storage unit is directed to enter the second sleep mode.

19. A control method controlling a first storage unit, comprising:

directing the first storage unit to enter a first sleep mode or a second sleep mode according to the access state of the first storage unit, wherein when entering the first sleep mode, the first storage unit has a first power consumption value, and when entering the second sleep mode, the first storage unit has a second power consumption value that is different from the first power consumption value;

determining whether an access request has been received; and directing the first storage unit to leave the first or second sleep mode when the access request has been received, wherein the step of directing the first storage unit to enter the first or second sleep mode according to the access state of the first storage unit comprises:

generating a first control signal according to the access state of the first storage unit;

determining a duty cycle of the first control signal, wherein when the duty cycle is equal to a first pre-determined value, the first storage unit is directed to enter the first sleep mode, when the duty cycle is equal to a second pre-determined value, the first storage unit is directed to enter the second sleep mode, and the second pre-determined value is different from the first pre-determined value; and determining a duration during which the level of the first control signal is at a specific level, wherein when the duration during which the level of the first control signal is at the specific level is greater than a maintenance period, the first storage unit is directed to leave the first or second sleep mode.

20. A control method controlling a first storage unit, comprising:

directing the first storage unit to enter a first sleep mode or a second sleep mode according to the access state of the first storage unit, wherein when entering the first sleep mode, the first storage unit has a first power consumption value, and when entering the second sleep mode, the first storage unit has a second power consumption value that is different from the first power consumption value;

determining whether an access request has been received; and directing the first storage unit to leave the first or second sleep mode when the access request has been received, wherein the step of directing the first storage unit to enter the first or second sleep mode according to the access state of the first storage unit comprises:

generating a first control signal and a second control signal according to the access state of the first storage unit;

determining levels of the first and second control signals; and when the levels of the first and second control signals match a first pre-determined state, the first storage unit is directed to enter the first sleep mode, when the levels of the first and second control signals match a second pre-determined state, the first storage unit is directed to enter the second sleep mode, and when the levels of the first and second control signals match a third pre-determined state, the first storage unit is directed to leave the first or second sleep mode.

* * * * *